H. W. HORTON.
MILK AND CHEESE PAN.
No. 171,667. Patented Jan. 4, 1876.
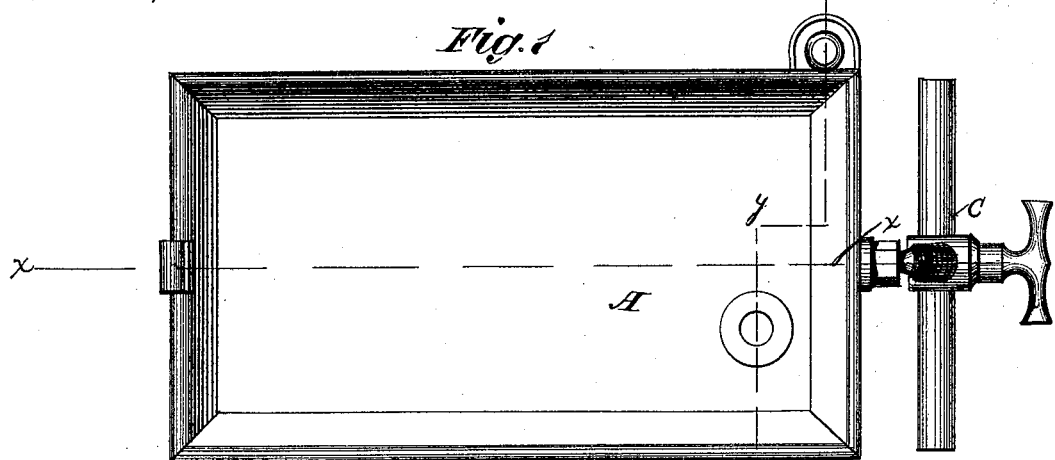
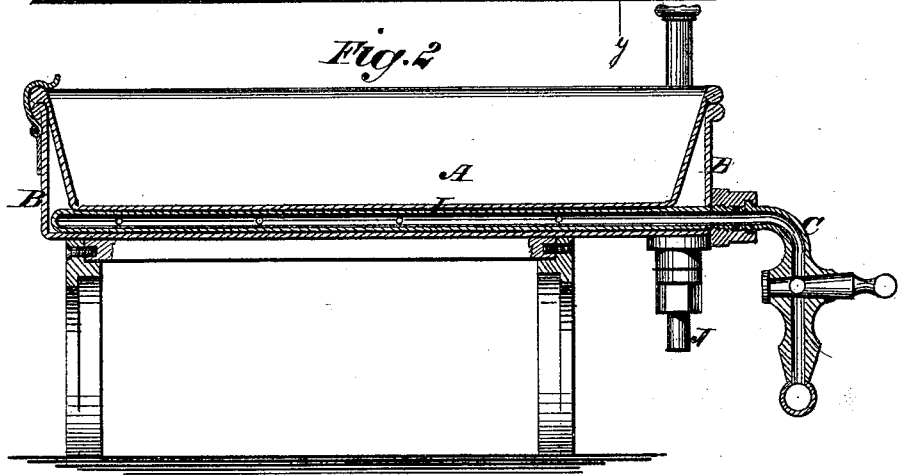
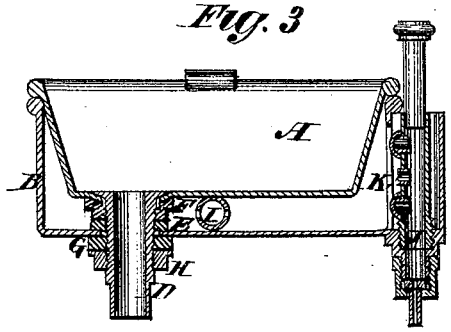 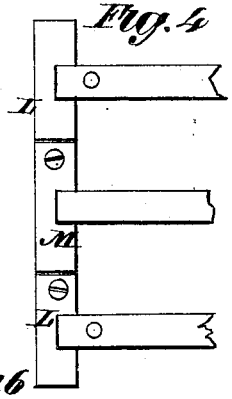 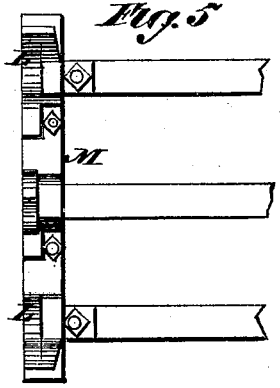
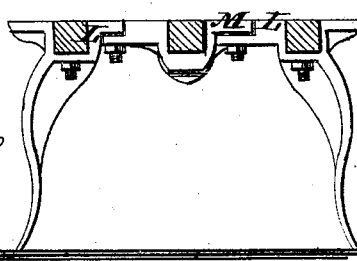
WITNESSES:
Francis McArdle
Alex F. Roberts
INVENTOR:
H. W. Horton
BY Munn & Co
ATTORNEYS.

UNITED STATES PATENT OFFICE.

HENRY W. HORTON, OF BINGHAMTON, NEW YORK.

IMPROVEMENT IN MILK AND CHEESE PANS.

Specification forming part of Letters Patent No. 171,667, dated January 4, 1876; application filed August 14, 1875.

*To all whom it may concern:*

Be it known that I, HENRY W. HORTON, of Binghamton, in the county of Broome and State of New York, have invented a new and Improved Milk and Cheese Pan, of which the following is a specification:

The invention will first be described in connection with drawing, and then pointed out in the claim.

Figure 1 is a plan view of the improved pan. Fig. 2 is a longitudinal sectional elevation taken on line $x\ x$ on Fig. 2. Fig. 3 is a transverse section taken on line $y\ y$ in Fig. 1; and Figs. 4, 5, and 6 are details, showing the construction of the extension-frame on which the pan is supported.

Similar letters of reference indicate corresponding parts.

A is the pan for containing the milk or other matters to be cooled or heated. B is the vat in which the pan rests, and in which the water or steam is admitted by pipe C, for cooling or heating the pan. D is a nozzle for connecting a pipe for drawing off the contents of the pan. It extends from the bottom of the pan down through the bottom of the vat, and has a washer, E, and a nut, F, screwed on above the bottom of the vat; also, the washer G and the nut H below the bottom, to make a water-tight joint, which is also detachable to allow of separating the pan and vat for cleaning. The water-pipe C is coupled onto a projection of a perforated pipe, I, extending along the vat from end to end, for distributing the water evenly. J is the overflow-pipe, which stands up in the water at one corner, and has the upper part detachable from the lower part, and also has a series of inlets, K, through any one of which the water may be made to escape by plugging up the holes below it. The upper part of the pipe is made detachable, to facilitate the plugging of these passages. The end pieces of the supporting-frame are made in sections L M, which are so fitted and bolted together that any number of the sections M can be put in to make them of any length required for pans of any width.

Having thus described my invention, I claim as new and desire to secure by Letters Patent—

1. A cooling-vat, B, provided with an overflow-pipe, J, having detachable upper portion with series of inlets, K, as and for the purpose specified.

2. The end pieces of the supporting-frame, made in extension-sections L M, substantially as specified.

HENRY W. HORTON.

Witnesses:
  SEYMOUR S. HORTON,
  NERI PINE.